(12) United States Patent
Krellner et al.

(10) Patent No.: US 8,944,201 B2
(45) Date of Patent: Feb. 3, 2015

(54) ENCLOSED CAB SYSTEM FOR MINING EQUIPMENT

(75) Inventors: James Krellner, Franklin, PA (US);
Ronald K. Dickey, Grove City, PA (US);
David P. Paich, Cranberry, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 427 days.

(21) Appl. No.: 13/369,622

(22) Filed: Feb. 9, 2012

(65) Prior Publication Data

US 2012/0204589 A1    Aug. 16, 2012

Related U.S. Application Data

(60) Provisional application No. 61/441,459, filed on Feb. 10, 2011.

(51) Int. Cl.
*B62D 33/06* (2006.01)
*B60H 1/00* (2006.01)
*B60J 5/04* (2006.01)
*E21F 13/02* (2006.01)

(52) U.S. Cl.
CPC ............ *B62D 33/06* (2013.01); *B60H 1/00378* (2013.01); *B60H 1/00435* (2013.01); *B60J 5/0487* (2013.01); *E21F 13/025* (2013.01)
USPC ....................... 180/89.12; 296/190.09; 165/42

(58) Field of Classification Search
CPC ........... B60H 1/00378; B60H 1/00435; B62D 33/0617
USPC ................... 180/89.12; 296/190.09; 454/158; 165/42
See application file for complete search history.

(56) References Cited

U.S. PATENT DOCUMENTS 3,522,839 A    8/1970   Wendt et al.
3,776,358 A  * 12/1973  Williams .................... 180/84
3,868,896 A  *  3/1975  Doll et al. .................. 454/137

(Continued)

FOREIGN PATENT DOCUMENTS

AU    2007202415    5/2008
AU    2006243875    6/2008

(Continued)

OTHER PUBLICATIONS

Buchsbaum, Foresight Energy Invests in Illinois: The Cline Group constructs four underground coal mining complexes, Coal Age, Dec. 2010, pp. 36-53.

(Continued)

*Primary Examiner* — Drew Brown
(74) *Attorney, Agent, or Firm* — Michael Best & Friedrich LLP

(57) ABSTRACT

An operator's cab for a shuttle car including a cab frame, a window assembly, and a pressurization system. The cab frame defines an interior chamber and an opening. The window assembly includes a pane and a pane seal. The pane is coupled to the cab frame such that the pane covers the opening and encloses the interior chamber. The pane seal is positioned between the pane and the cab frame. The pressurization system provides a positive pressure in the interior chamber relative to the surrounding environment. The pressurization system includes a blower and a motor for driving the blower. The blower is in fluid communication with the interior chamber.

25 Claims, 19 Drawing Sheets

(56) References Cited

U.S. PATENT DOCUMENTS

| | | | |
|---|---|---|---|
| 3,983,715 A * | 10/1976 | Hair et al. | 62/243 |
| 4,068,728 A * | 1/1978 | Subrick | 173/27 |
| 4,120,527 A * | 10/1978 | Lawrence | 296/190.09 |
| 4,278,144 A | 7/1981 | Perin | |
| 4,294,082 A * | 10/1981 | Gerboth et al. | 62/244 |
| 4,344,356 A | 8/1982 | Casterton et al. | |
| 4,467,706 A * | 8/1984 | Batcheller et al. | 454/70 |
| 4,480,867 A | 11/1984 | Ezell et al. | |
| 4,492,151 A | 1/1985 | Mattei | |
| 4,612,975 A | 9/1986 | Ikari | |
| 4,616,725 A | 10/1986 | McDaniel | |
| 4,771,855 A | 9/1988 | Takashima et al. | |
| 4,846,529 A | 7/1989 | Tulley | |
| 5,275,255 A | 1/1994 | Huntley et al. | |
| 5,308,279 A | 5/1994 | Grinberg | |
| 5,318,100 A * | 6/1994 | Aoki | 165/202 |
| 5,799,746 A | 9/1998 | Kortelainen et al. | |
| 5,890,764 A | 4/1999 | Lee | |
| 5,992,156 A | 11/1999 | Isobe et al. | |
| 6,012,295 A | 1/2000 | Isobe et al. | |
| 6,022,182 A | 2/2000 | Everett | |
| 6,039,141 A | 3/2000 | Denny | |
| 6,095,263 A | 8/2000 | Saunders et al. | |
| 6,186,573 B1 | 2/2001 | Thurab | |
| 6,196,308 B1 | 3/2001 | Halligan | |
| 6,220,656 B1 | 4/2001 | Martin, Jr. | |
| 6,446,738 B1 | 9/2002 | Boyd | |
| 6,543,848 B1 | 4/2003 | Suga et al. | |
| 6,557,919 B2 | 5/2003 | Suga et al. | |
| 6,572,172 B1 | 6/2003 | Ninomiya et al. | |
| 6,578,854 B2 | 6/2003 | Wucherpfennig et al. | |
| 6,629,572 B2 | 10/2003 | Womer et al. | |
| 6,684,969 B1 | 2/2004 | Flowers et al. | |
| 6,688,682 B2 * | 2/2004 | Arthur et al. | 296/216.02 |
| 6,729,031 B2 * | 5/2004 | McKee | 52/204.1 |
| 6,755,270 B2 | 6/2004 | Saarinen | |
| 6,955,009 B2 * | 10/2005 | Rasmussen | 49/413 |
| 6,955,239 B2 | 10/2005 | Ueda et al. | |
| 6,981,746 B2 | 1/2006 | Chung et al. | |
| 7,036,883 B1 | 5/2006 | Thompson et al. | |
| 7,059,680 B2 | 6/2006 | Billger et al. | |
| 7,069,736 B2 | 7/2006 | Kamimae et al. | |
| 7,083,019 B2 | 8/2006 | Chiou et al. | |
| 7,086,241 B2 * | 8/2006 | Holt | 62/115 |
| 7,159,687 B2 | 1/2007 | Dunn et al. | |
| 7,243,982 B2 | 7/2007 | Kelley et al. | |
| 7,294,181 B1 | 11/2007 | Smith | |
| 7,347,299 B2 | 3/2008 | Billger et al. | |
| 7,434,863 B2 | 10/2008 | Hamazaki et al. | |
| 7,520,567 B2 | 4/2009 | Billger et al. | |
| 7,575,276 B1 | 8/2009 | Henry | |
| 7,681,630 B2 | 3/2010 | Klassen et al. | |
| 7,699,328 B2 | 4/2010 | Crawford | |
| 8,056,617 B2 | 11/2011 | Klassen et al. | |
| 2003/0070900 A1 | 4/2003 | Ewell | |
| 2003/0205421 A1 * | 11/2003 | Allen et al. | 180/65.1 |
| 2003/0230447 A1 | 12/2003 | Wulfert et al. | |
| 2006/0061122 A1 | 3/2006 | Billger et al. | |
| 2006/0144634 A1 | 7/2006 | Portscheller et al. | |
| 2007/0145759 A1 | 6/2007 | Crawford et al. | |
| 2009/0218327 A1 | 9/2009 | Beeson | |
| 2009/0276122 A1 | 11/2009 | Demong et al. | |
| 2010/0126188 A1 * | 5/2010 | Clarke | 62/77 |
| 2010/0300796 A1 | 12/2010 | Ryan et al. | |
| 2012/0068478 A1 * | 3/2012 | Nania | 292/165 |
| 2012/0204589 A1 | 8/2012 | Krellner et al. | |
| 2012/0224941 A1 | 9/2012 | Peterson et al. | |
| 2013/0004273 A1 * | 1/2013 | Webb | 414/507 |
| 2013/0140092 A1 | 6/2013 | Warr | |

FOREIGN PATENT DOCUMENTS

| | | |
|---|---|---|
| AU | 2008247324 | 11/2008 |
| AU | 2007216811 | 4/2009 |
| DE | 9204392 | 5/1992 |
| DE | 102006018537 | 11/2007 |
| EP | 1669225 | 6/2006 |
| GB | 1022623 | 3/1966 |
| GB | 1126449 A | 9/1968 |
| JP | 2006232010 A | 9/2006 |
| JP | 2010215143 A | 9/2010 |
| PL | 141849 B1 | 8/1987 |
| PL | 174838 | 9/1998 |
| WO | WO 2009050747 | 4/2009 |

OTHER PUBLICATIONS

PCT/US2011/026646 International Search Report and Written Opinion dated Apr. 25, 2011 (13 pages).

PCT/US2011/026646 International Preliminary Report on Patentability and Written Opinion dated Sep. 12, 2013 (9 pages).

First Patent Examination Report from the Intellectual Property Office of Australia for Application No. 2012258458 dated Oct. 10, 2013 (3 pages).

Office Action from the United States Patent and Trademark Office for U.S. Appl. No. 13/037,878 dated Jan. 7, 2013 (26 pages).

Office Action from the United States Patent and Trademark Office for Application No. dated Jan. 2, 2014 U.S. Appl. No. 13/691,920 (14 pages).

Search Report from the Patent Office of the Republic of Poland for Application No. P-398070 dated May 9, 2012 (2 pages).

Search Report from the United Kingdom Intellectual Property Office for Application No. 1202267.9 dated Jun. 27, 2012 (4 pages).

First Patent Examination Report from the Intellectual Property Office of Australia for Application No. 2012200739 dated Mar. 19, 2014 (4 pages).

Second Patent Examination Report from the Intellectual Property Office of Australia for Application No. 2012258458 dated Apr. 28, 2014 (4 pages).

* cited by examiner

ENCLOSED CAB SYSTEM FOR MINING EQUIPMENT

CROSS-REFERENCE TO RELATED APPLICATIONS

This application claims the benefit of U.S. Provisional Application 61/441,459, filed Feb. 10, 2011, the entire contents of which are incorporated herein by reference.

BACKGROUND

The present invention relates to underground mining equipment, and in particular an operator cab for use on the mining equipment.

Shuttle cars are used in underground mining operations to transport mined material. Conventional shuttle cars include a conveyor chain or belt and an operator cab. The operator cab is open to the surrounding environment, which exposes the operator to the polluted air of the underground mine, including dust and particulate matter that can irritate the operator's eyes and respiratory organs. In addition, small enclosed spaces can reach high temperatures, making the cab uncomfortable for the operator. Conventional air conditioning systems and attempts to enclose the cab are poorly suited for underground mining because the volatile atmosphere of the underground mine prohibits the use of any electrical systems.

SUMMARY OF INVENTION

In one embodiment, the invention provides an operator cab for a shuttle car. The operator cab includes a cab frame, a window assembly, and a pressurization system. The cab frame defines an interior chamber and an opening. The window assembly includes a pane and a pane seal. The pane is coupled to the cab frame such that the pane covers the opening and encloses the interior chamber. The pane seal is positioned between the pane and the cab frame. The pressurization system provides a positive pressure in the interior chamber relative to the surrounding environment. The pressurization system includes a blower and a motor for driving the blower. The blower is in fluid communication with the interior chamber.

In another embodiment, the invention provides an operator cab for a shuttle car. The operator cab includes a cab frame, a window assembly, and an air conditioning system. The cab frame defines an interior chamber having an opening. The window assembly includes a pane and a pane seal, the pane being coupled to the cab frame such that the pane covers the opening and encloses the interior chamber, the pane seal being positioned between the pane and the cab frame. The air conditioning system controls the temperature within the interior chamber. The air conditioning system is hydraulically-driven.

In yet another embodiment, the invention provides a shuttle car including a body, a drive system for moving the shuttle car, and an enclosed operator cab. The body includes a conveyor chain for loading and unloading material to be transported. The enclosed operator's cab includes a cab frame, a window assembly, and a pressurization system. The cab frame defines an interior chamber having an opening. The window assembly includes a pane and a pane seal, the pane being coupled to the cab frame such that the pane covers the opening and encloses the interior chamber, the pane seal being positioned between the pane and the cab frame. The pressurization system provides a positive pressure in the interior chamber relative to the surrounding environment. The pressurization system includes a blower and a motor for driving the blower, and the blower is in fluid communication with the interior chamber.

In still another embodiment, the invention provides a climate control system for an interior cab of a shuttle car, the interior cab being defined by a cab frame including an opening. The climate control system includes a window assembly, a pressurization system, and an air conditioning system. The window assembly includes a pane and a pane seal, the pane being coupled to the cab frame to cover the opening, the pane seal being positioned between the pane and the cab frame to seal the interior cab. The pressurization system provides a positive pressure in the interior cab relative to a surrounding environment. The pressurization system includes a blower and a motor for driving the blower, and the blower is in fluid communication with the interior cab. The air conditioning system controls the temperature within the interior cab.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
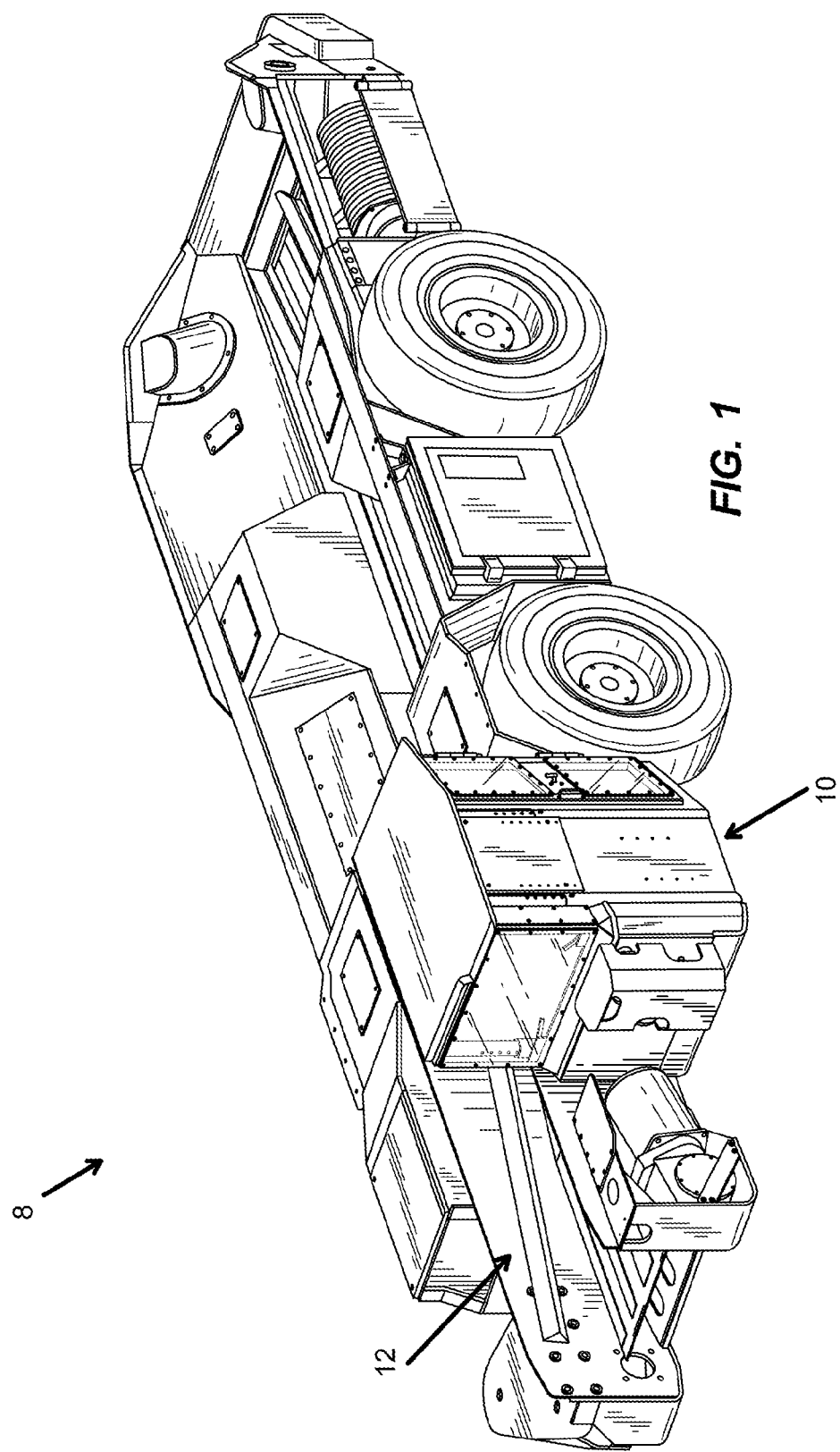
FIG. 1 is a perspective view of a shuttle car.
Figure 1A:
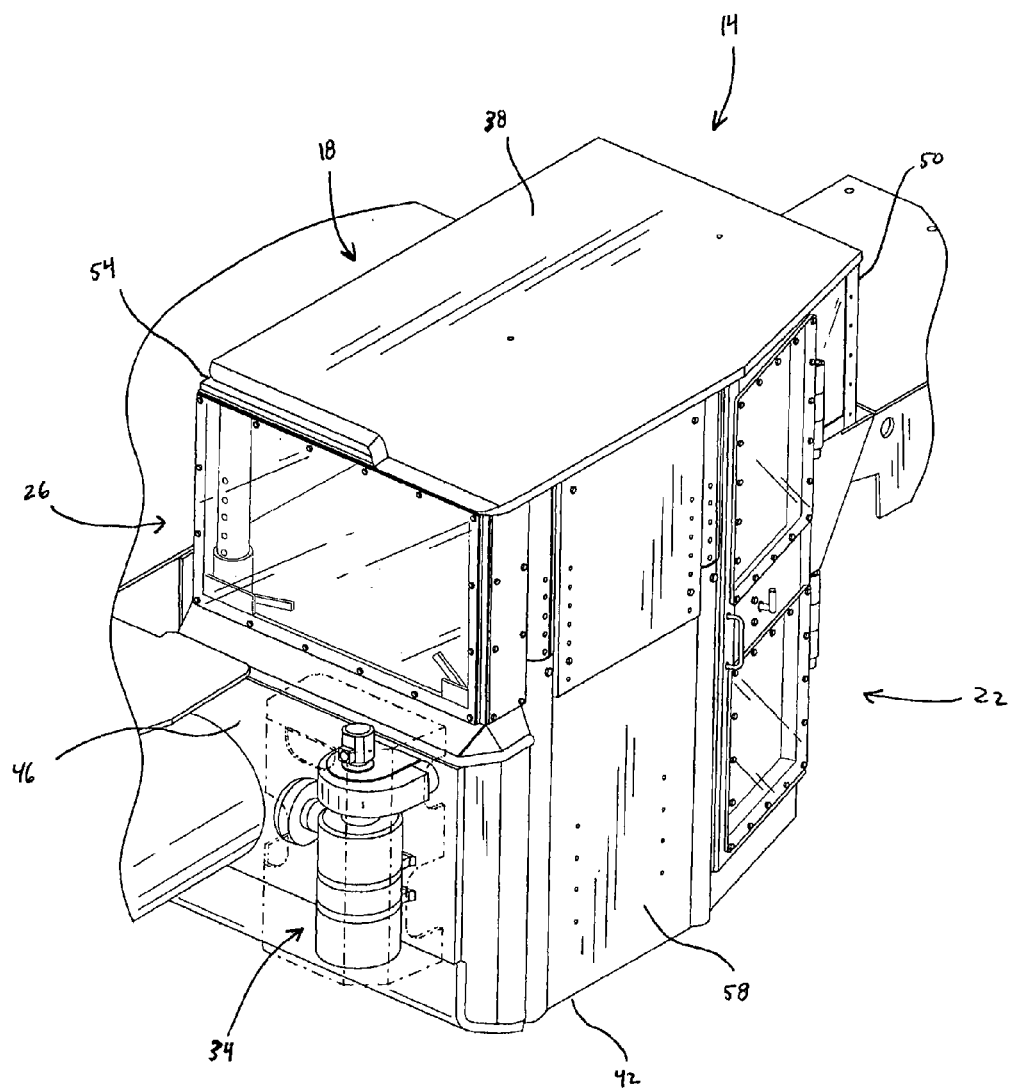
FIG. 1A is a perspective view of an enclosed cab.
Figure 2:
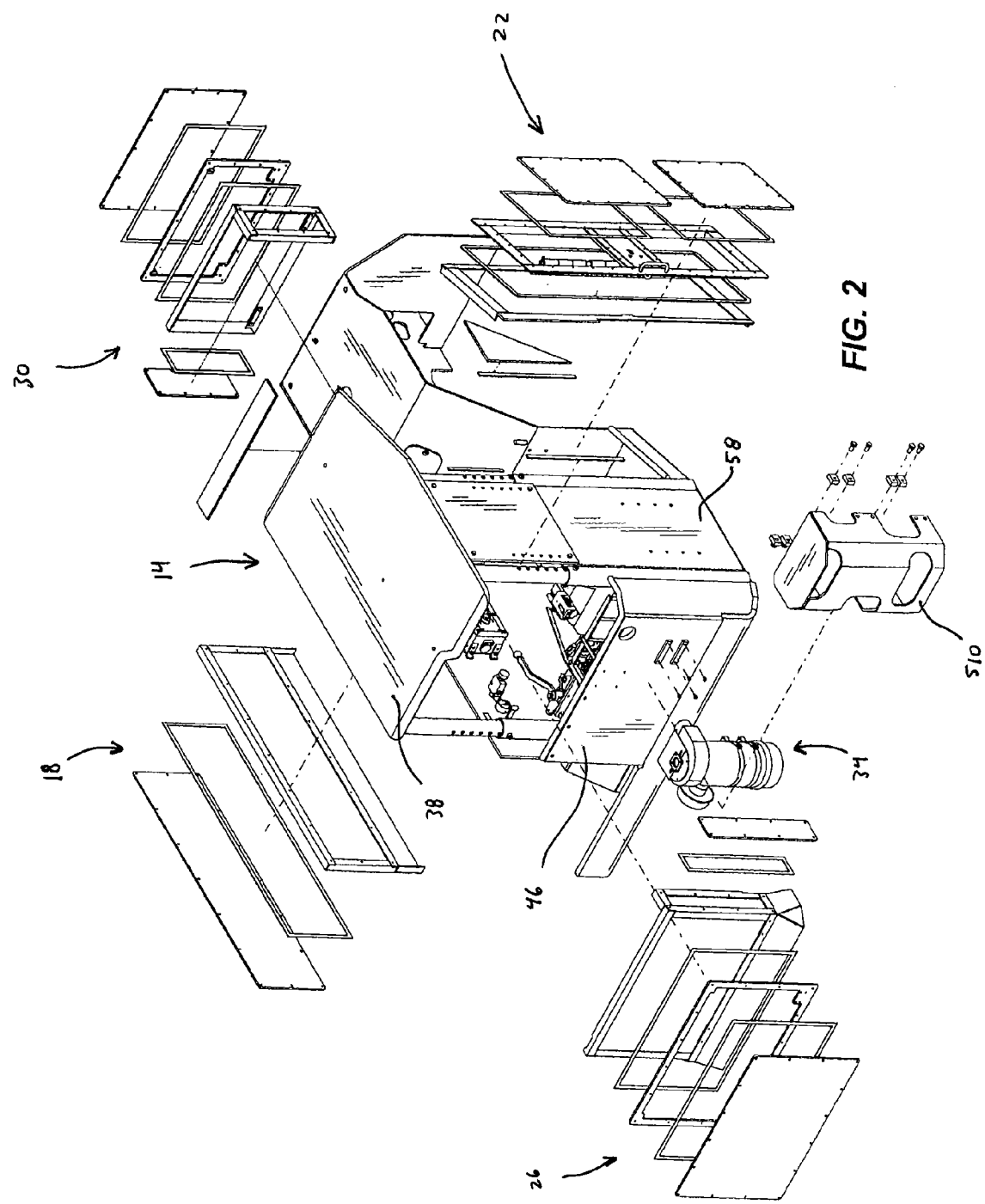
FIG. 2 is an exploded view of the enclosed cab shown in FIG. 1.
Figure 6:
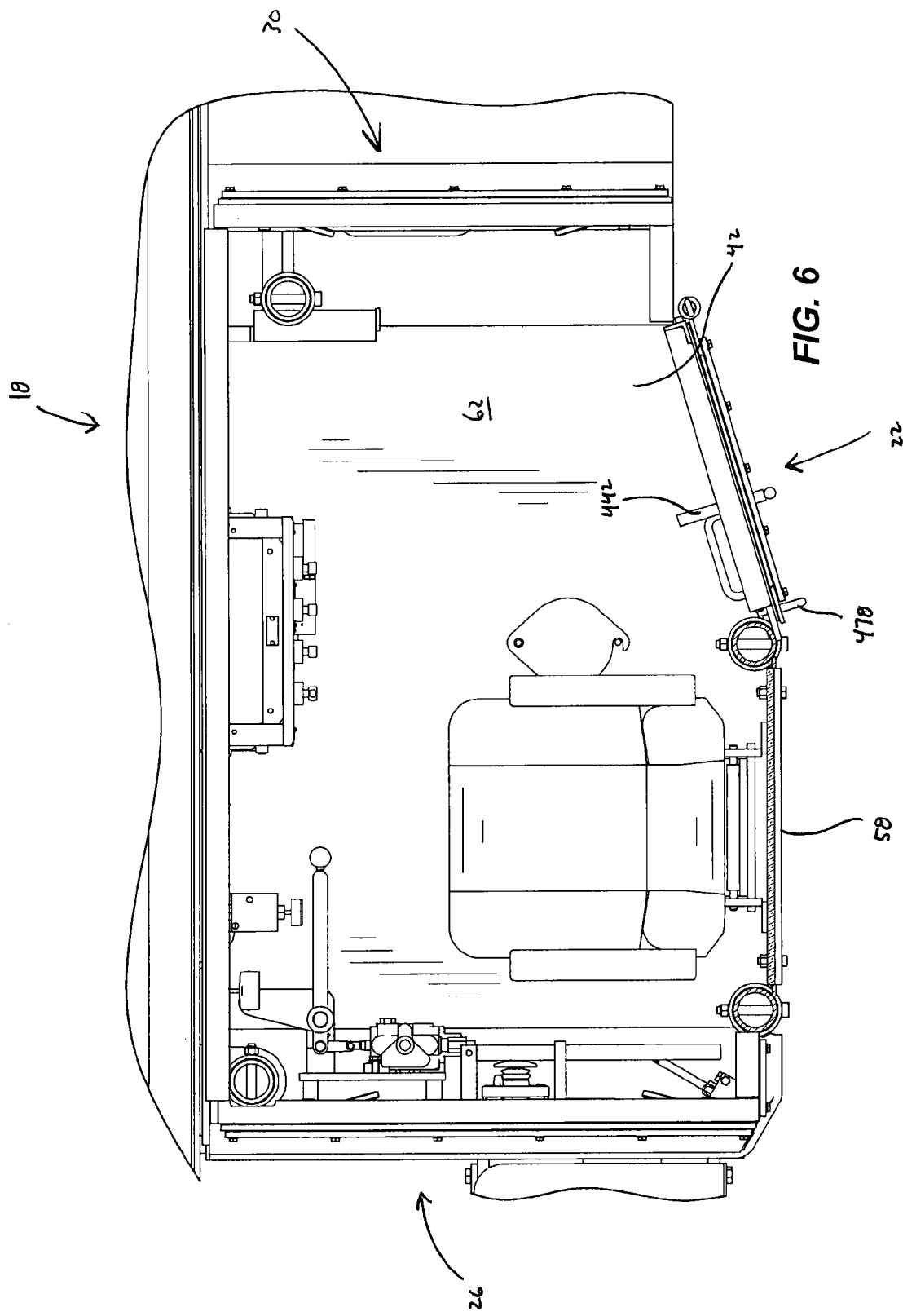
FIG. 6 is a top view of an interior of the enclosed cab shown in FIG. 1.

FIG. 1 shows a shuttle car 8 including an enclosed operator cab system 10 and a conveyor portion 12 for supporting a conveyor chain or belt (not shown). FIGS. 1A and 2 illustrate the enclosed operator cab system 10 according to one embodiment of the invention and for use with underground mining equipment, such as a shuttle car. The enclosed cab system 10 includes a frame or housing 14, a side window assembly 18, a cab door 22 for permitting an operator to enter and exit the cab 10, a rear window assembly 26, a front window assembly 30, and a pressurization system 34. The housing 14 includes a roof 38, a floor 42 (FIG. 6), a rear wall 46, a front wall 50 opposite the rear wall 46, a first side wall 54, and a second side wall 58. Space contained between the walls 46, 50, 54, 58, the roof 38 and the floor 42 of the housing 14 generally defines an operator cab 62.

As described below, the window assemblies 18, 26, 30 and the cab door 22 further enclose the operator cab 62 and insulate the cab 62 from the surrounding environment. The pressurization system 34 creates an elevated air pressure within the cab 62, which prevents dust and particulate matter from entering the cab 62. The enclosed cab system 10 therefore protects the operator from pollutants in the surrounding environment. The addition of an air conditioning system maintains a comfortable temperature within the operator cab 62 by removing heat from the enclosed cab 10.

Figure 2A:
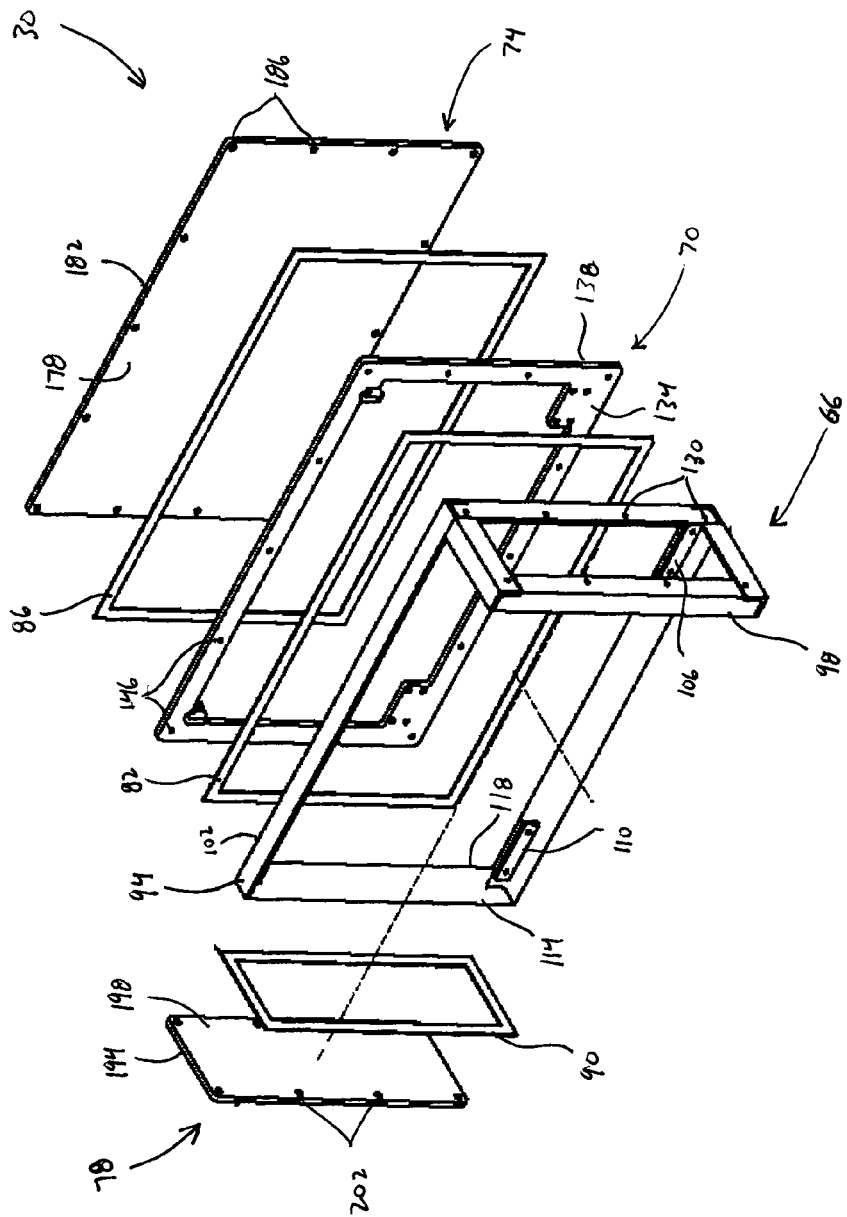
FIG. 2A is an enlarged, exploded view of a front window assembly.
Figure 3:
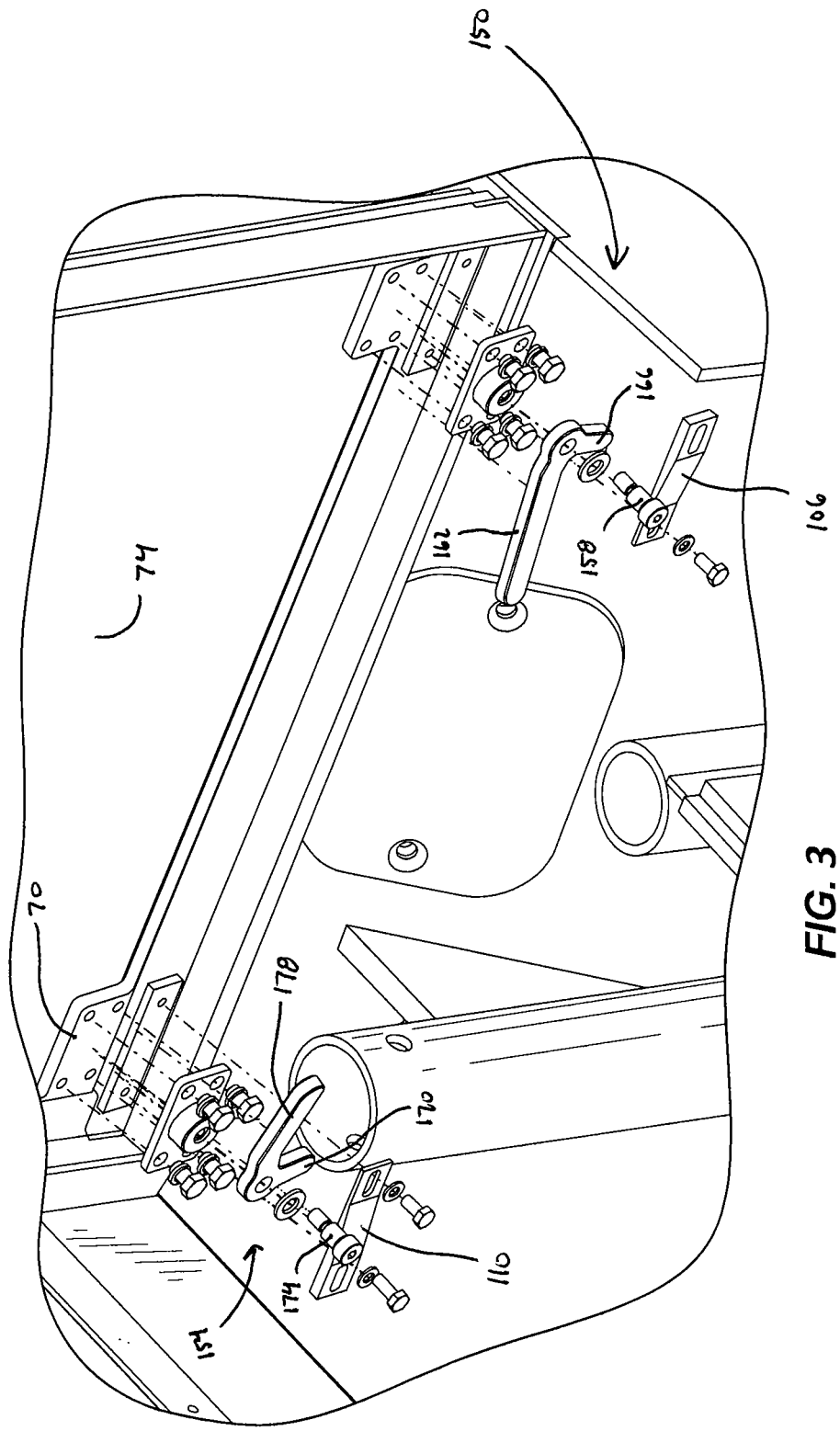
FIG. 3 is a perspective view of an interior of a front window assembly.

Referring to FIGS. 2 and 2A, the front window assembly 30 is located on the front wall 50 of the housing 14. The front window assembly 30 includes a primary frame 66, a pane frame 70, a main window pane 74, an auxiliary window pane 78, a first main seal 82, a second main seal 86, and an auxiliary seal 90. The primary frame 66 is coupled to the front wall 50 of the housing 14 and includes a main support 94 and an auxiliary support 98. The main support 94 includes a mounting member 102, a right latch receiving mechanism 106, and a left latch receiving mechanism 110. It should be noted that the terms "right" and "left" are only meant to describe the relative positions of the latch receiving mechanisms 106, 110 as illustrated in FIG. 3. The mounting member 102 includes an interior side 114 and an oppositely-facing exterior side 118, and in the illustrated embodiment the mounting member 102 has a rectangular shape that defines a central opening. The right latch receiving mechanism 106 is positioned on the right, interior side of the mounting member 102, while the left latch receiving mechanism 110 is positioned on the left, interior side of the mounting member 102. The auxiliary support 98 has a rectangular shape defining a central opening, and includes holes 130 positioned along the perimeter.

The pane frame 70 has an interior side 134 and an exterior side 138, and has the same shape as the mounting member 102 (i.e., rectangular in the illustrated embodiment). The pane frame 70 includes a central opening that is substantially the same size as the opening of the mounting member 102. The pane frame 70 includes holes 146 positioned along the perimeter, a right latch mechanism 150 and a left latch mechanism 154 (FIG. 3). The right latch mechanism 150 includes a pivot 158, a handle arm 162 extending from the pivot 158, and a latch arm 166 extending from the pivot 158 at an angle with respect to the handle arm 162. The pivot 158 is rotatably mounted onto the right interior side of the pane frame 70. Similarly, the left latch mechanism 154 comprises the same components (i.e., a latch arm 170, a pivot 174 and a handle arm 178), and is mounted on the left interior side of the pane frame 70. In the illustrated embodiment, an open position is defined by the latch arms 166, 170 being in a horizontal orientation, and a closed position is defined by the latch arms 166, 170 being in a downward orientation. Alternatively, the pane frame 70 for the rear and front window assemblies 26, 30 may be formed having fewer or more latch mechanisms 150, 154. In other embodiments, the latch mechanisms 150, 154 may be coupled onto the main support 94 and the latch receiving mechanisms 106, 110 may be coupled to the pane frame 70.

With further reference to FIG. 2A, the main window pane 74 comprises a flat sheet of transparent polycarbonate material having an interior side 178 and an exterior side 182. The main window pane 74 also includes holes 186 positioned along the perimeter and corresponding to the holes 146 on the pane frame 70. In the illustrated embodiment, each of the first main seal 82 and the second main seal 86 has a rectangular shape defining a central open area. The first main seal 82 is mounted on the interior side 134 of the pane frame 70 and the second main seal 86 is mounted on the interior side 178 of the main window pane 74.

The main window pane 74 is coupled to the exterior side 138 of the pane frame 70 by aligning the holes 186 of the pane 74 with the holes 146 of the pane frame 70. A fastener (not shown) is passed through each of the corresponding holes 146, 186 and is tightened such that the second main seal 86 is compressed between the pane 74 and pane frame 70. With both latch arms 166, 170 in the open position, the pane frame 70 is then mounted onto the main support 94 of the primary frame 66 by aligning the pane frame 70 with the exterior side of the mounting member 102, such that the right latch arm 166 is positioned proximate to the right latch receiving mechanism 106 and the left latch arm 170 is positioned proximate the left latch receiving mechanism 110. Each handle arm 162, 178 is then turned, bringing the latch arms 166, 170 into the closed position and locking the latch arms 166, 170 into the respective latch receiving mechanism 106, 110, which compresses the first main seal 82 between the pane frame 70 and the mounting member 102. The pane frame 70 is thus secured against the mounting member 102 of the main support 94.

Referring to FIG. 2A, the auxiliary window pane 78 comprises a flat sheet of transparent polycarbonate material having an interior side 194 and an exterior side 198. The auxiliary window pane 78 also includes holes 202 positioned along the perimeter and corresponding to the holes 130 on the auxiliary support 98. The auxiliary seal 90 has a rectangular shape defining a central open area substantially the same size as the central opening of the auxiliary support 98. The auxiliary seal 90 is mounted onto the exterior side 198 of the auxiliary window pane 78. The auxiliary window pane 78 is then coupled to the auxiliary support 98 by placing the exterior side 198 of the auxiliary window pane 78 proximate to the auxiliary support 98 and aligning the pane holes 202 with the support holes 130. A fastener (not shown) is passed through each set of holes 202, 130 and tightened such that the auxiliary seal 90 is compressed between the auxiliary pane 78 and the auxiliary support 98.

Alternatively, the auxiliary seal 90 may be placed on the interior side 194 of the auxiliary pane 78. In this case, the pane 78 is mounted by placing the interior side 194 proximate to the auxiliary support 98. A fastener (not shown) is passed through each set of holes 202, 130 and tightened such that the auxiliary seal 90 is compressed between the auxiliary pane 78 and the auxiliary support 98.

Figure 2B:
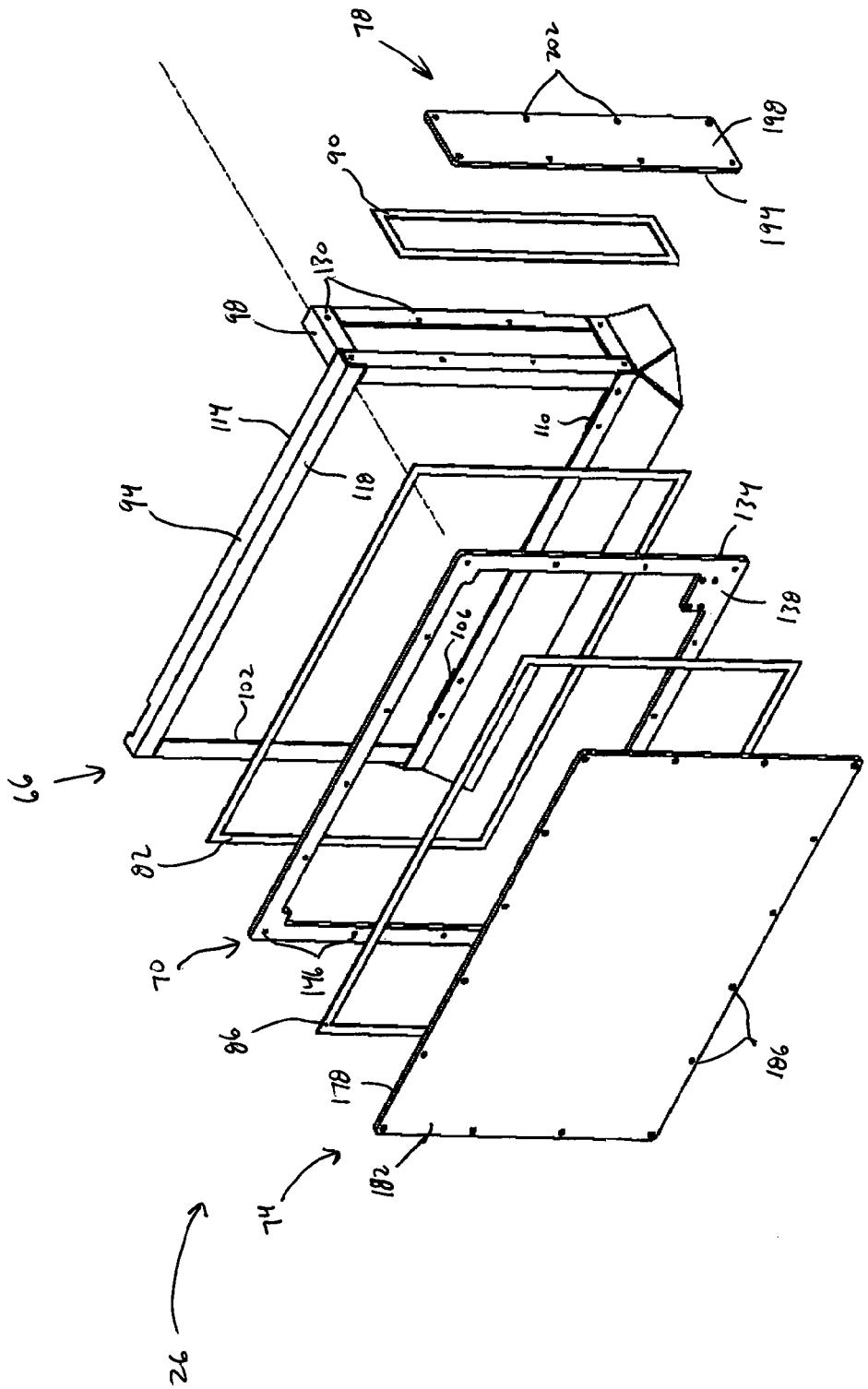
FIG. 2B is an enlarged, exploded view of a rear window assembly.

As shown in FIGS. 2 and 2B, the rear window assembly 26 is located on the rear wall 46 of the housing 14. In a manner similar to the front window assembly 30, the rear window assembly 26 is coupled to the rear wall 46 of the housing 14. The rear window assembly 26 comprises the same elements as the front window assembly 30, and the rear window assembly 26 is constructed in the same manner as described above for the front window assembly.

Figure 2C:
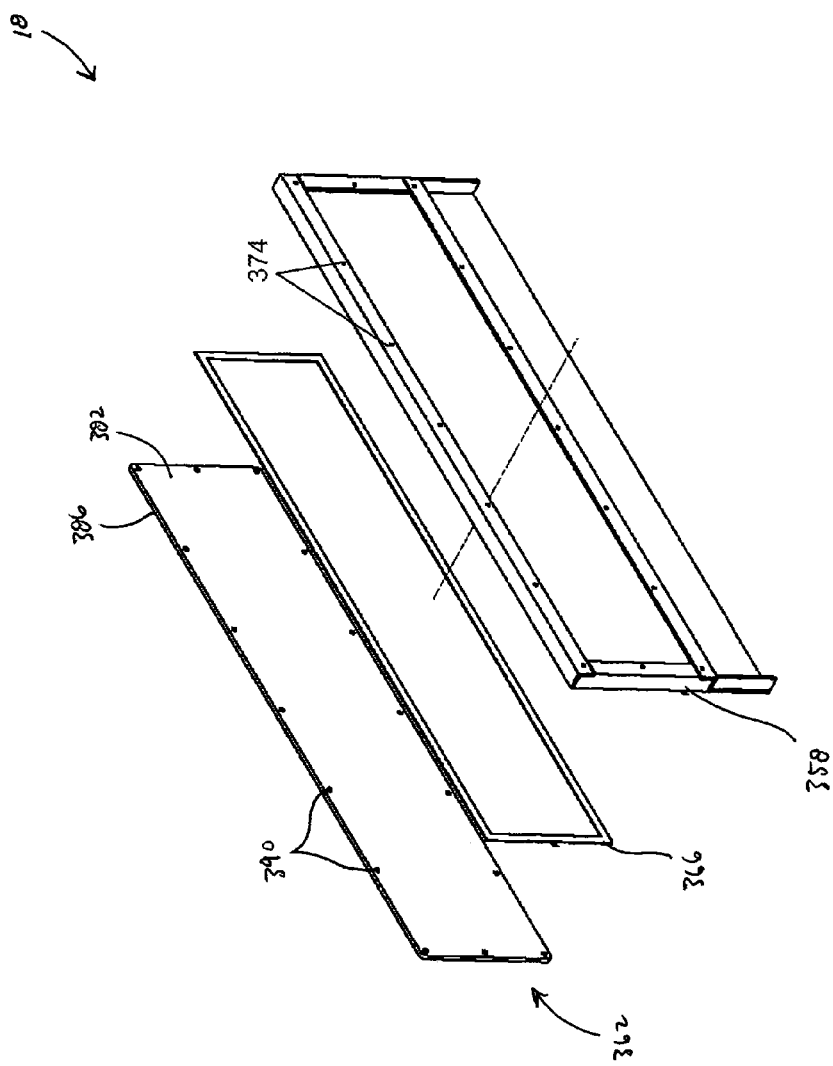
FIG. 2C is an enlarged, exploded view of a side window assembly.

Referring to FIGS. 2 and 2C, the side window assembly 18 is coupled to the first side wall 54 of the housing 14 and includes a side frame 358, a side pane 362, and a side seal 366. In the illustrated embodiment, the side frame 358 has a rectangular shape defining a central opening, and includes holes 374 located along a perimeter. The side pane 362 comprises a flat sheet of transparent polycarbonate material having an interior side 382 and an exterior side 386. The side pane 362 also includes holes 390 located along a perimeter and corresponding to the holes 374 on the side frame 358. The side seal 366 has a rectangular shape defining a central open area substantially the same size as the central opening of the side frame 358. The side seal 366 is mounted onto one of the interior side 382 of the side pane 362 and the side frame 358. The side pane 362 is coupled to the side frame 358 by placing the interior side 382 of the side pane 362 proximate to the side frame 358 and aligning the holes 390 on the side pane 362 with the holes 374 on the side frame 358. A fastener (not shown) is passed through each set of holes 390, 374 and tightened such that the side seal 366 is compressed between the side pane 362 and the side frame 358.

Figure 2D:
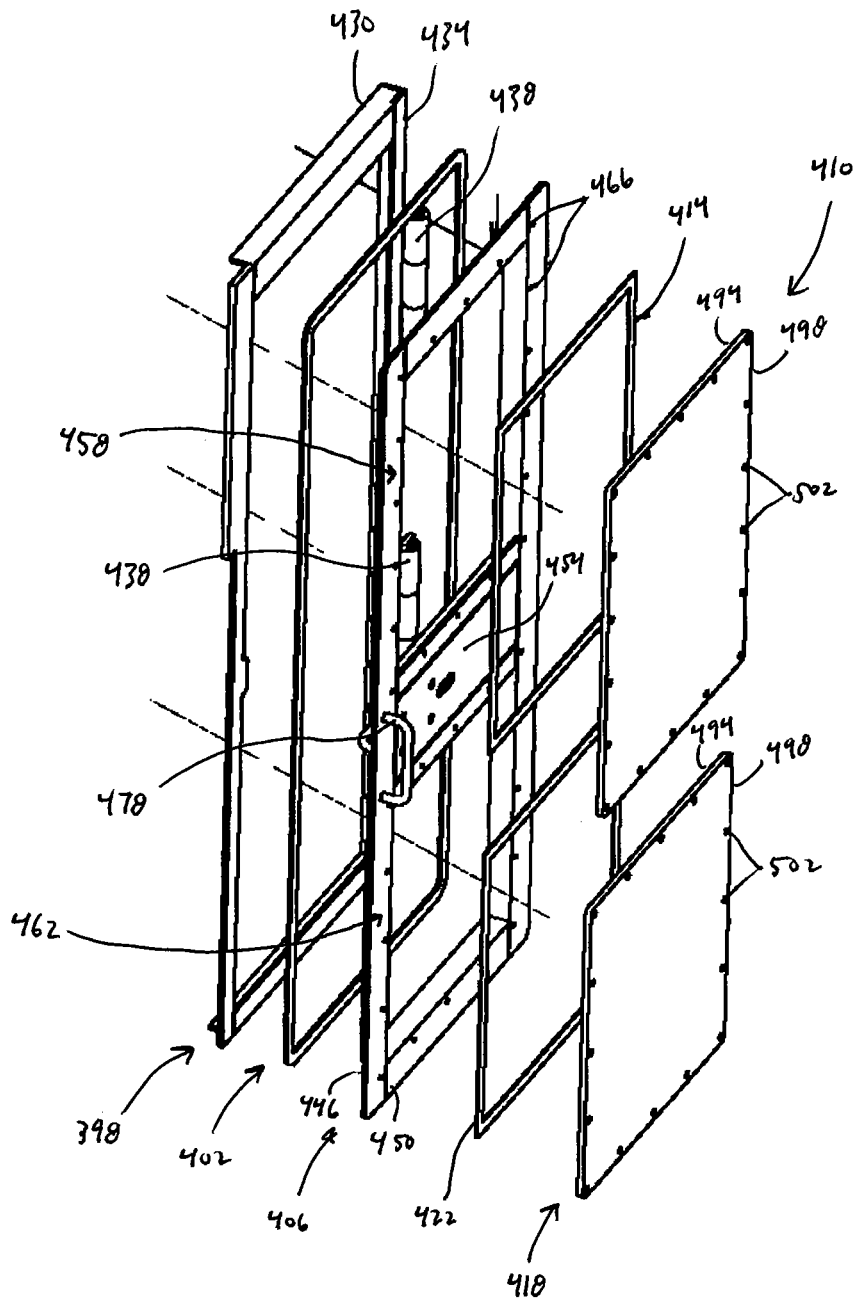
FIG. 2D is an enlarged, exploded view of a cab door.
Figure 4:
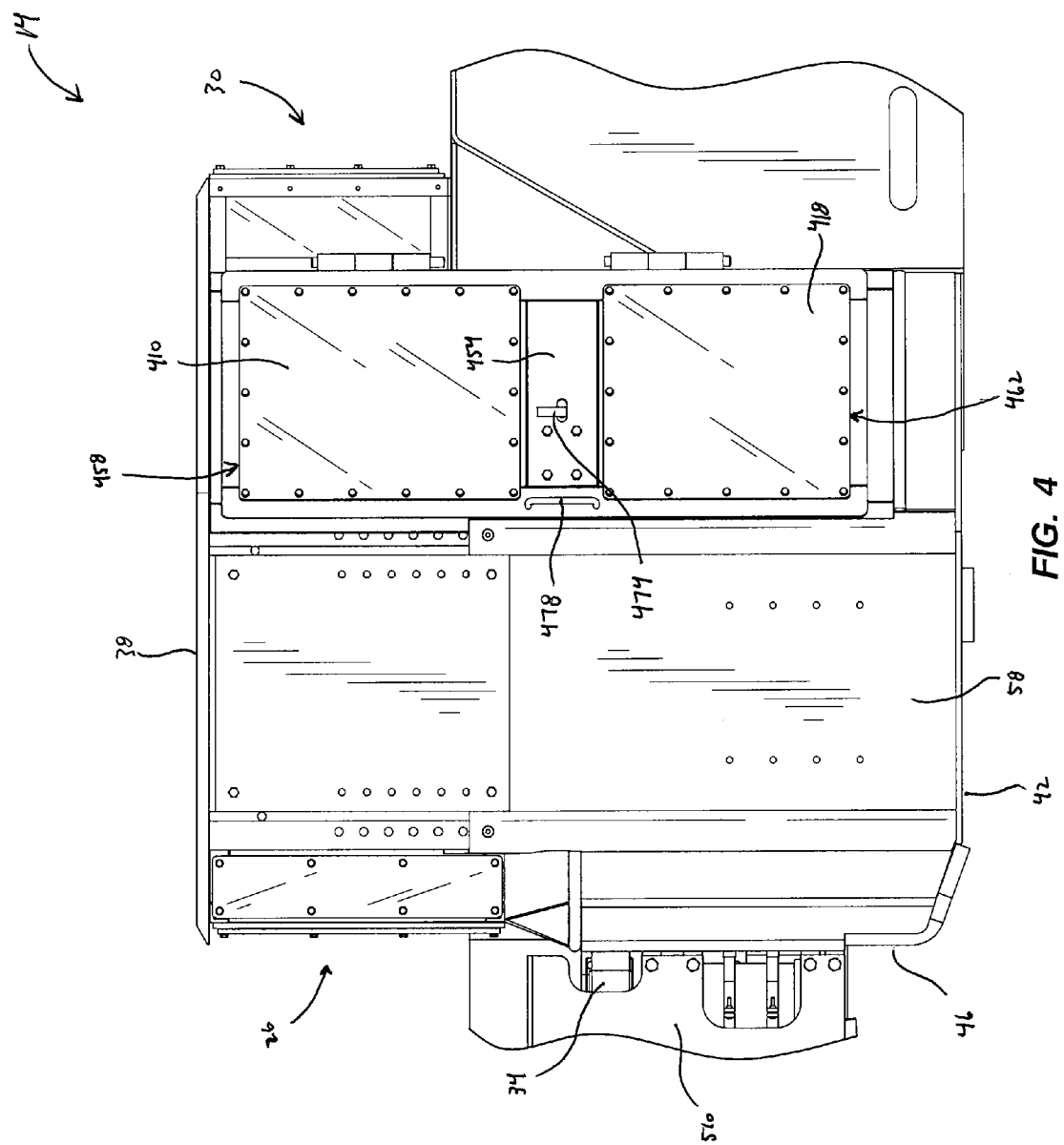
FIG. 4 is a side view of the enclosed cab shown in FIG. 1.

As shown in FIGS. 2, 2D and 4, the cab door assembly 22 is coupled to the second side wall 58 of the housing 14 and includes a fixed frame 398, a door seal 402, a door 406, an upper window pane 410, an upper window seal 414, a lower window pane 418, and a lower window seal 422. In the illustrated embodiment, the fixed frame 398 has a rectangular shape defining a central opening. The fixed frame 398 has an interior side 430 and an exterior side 434, and includes hinge members 438 positioned on an edge of the exterior side 434.

Referring to FIGS. 2D and 4, the door 406 has an interior side 446 and an exterior side 450. In the illustrated embodiment, the door 406 has a rectangular shape with a panel 454 mounted laterally between two opposing edges of the door 406, whereby the panel 454 defines an upper portion 458 and a lower portion 462 of the door 406. The upper portion 458 includes holes 466 positioned along a perimeter of an opening defined by the door 406 and an upper edge of the panel 454. Likewise, the lower portion 462 includes holes 466 positioned along a perimeter of an opening defined by the door 406 and a lower edge of the panel 454. The door seal 402 has a rectangular shape defining a central open area, which is substantially the same size as the door 406. The door seal 402 is coupled to either the interior side 446 of the door 406 or the exterior side 434 of the fixed frame 398.

Figure 7:
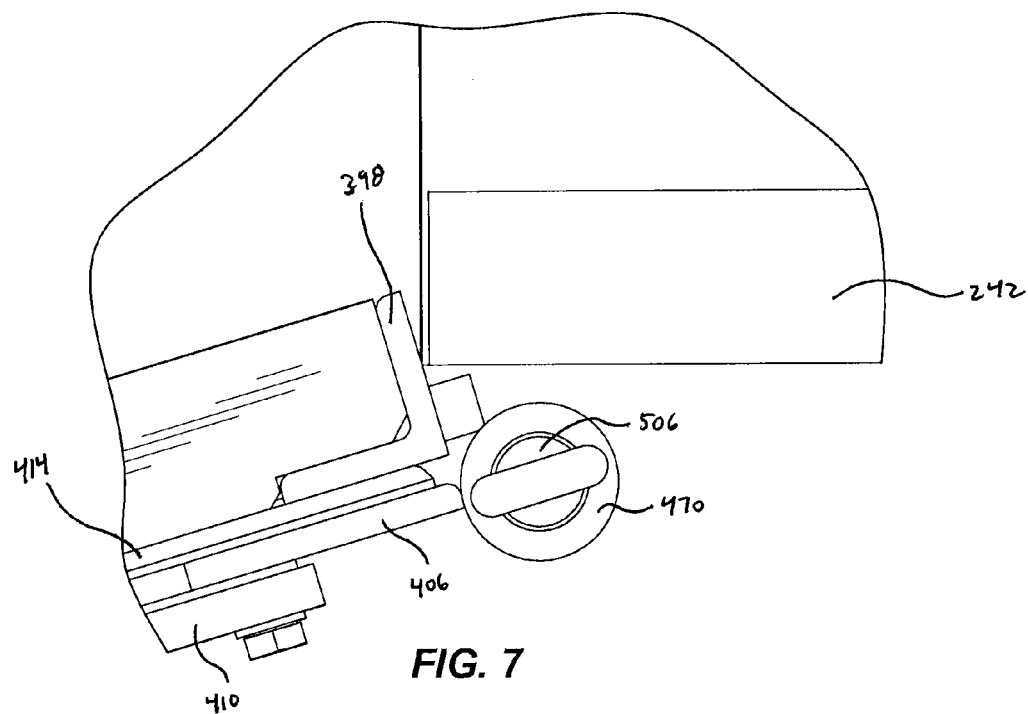
FIG. 7 is an enlarged top view of a cab door hinge for use with the enclosed cab.
Figure 8:
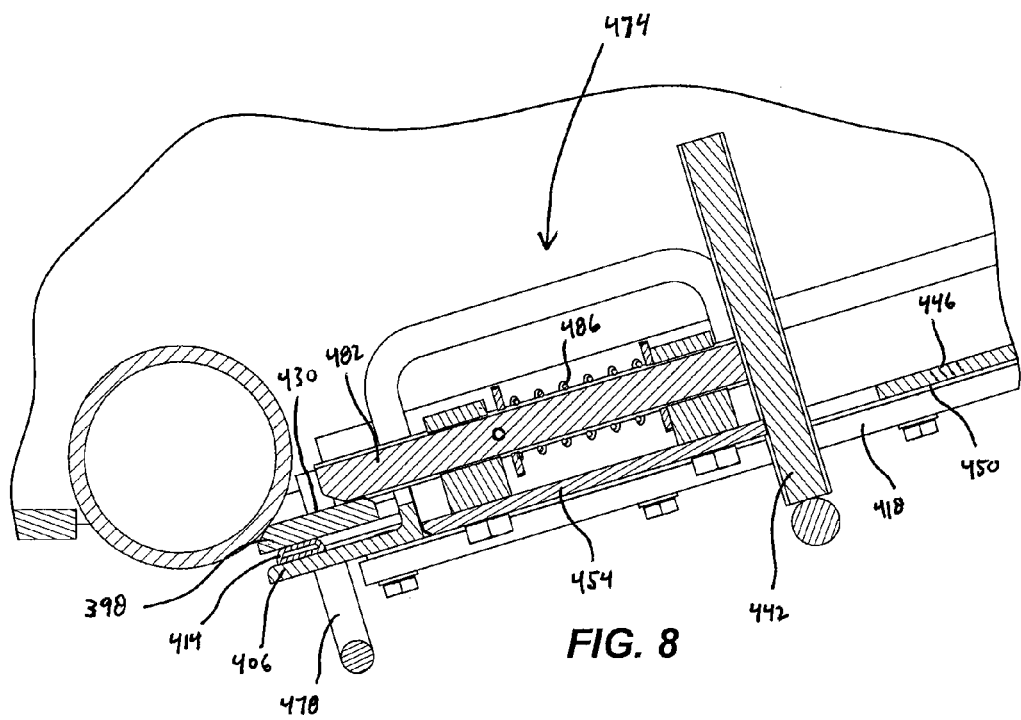
FIG. 8 is an enlarged section view of a cab door latch for use with the enclosed cab.

As shown in FIGS. 7 and 8, the door 406 further includes hinge members 470 (only one of which is shown in FIG. 7), a door latch 474, and a door handle 478. Referring to FIG. 7, the hinge member 470 is positioned along one edge of the door 406 and located on the interior side 446 of the door 406. As shown in FIG. 8, the door handle 478 is mounted onto the exterior side 450 of the door 406. The door latch 474 is mounted onto the panel 454 and located on the interior side 446 of the door 406. The door latch 474 includes a plunger 482 biased towards an extended position by a spring 486 and a latch lever 442. When the door 406 is adjacent to the fixed frame 398, the plunger 482 extends to contact the interior side 430 of the fixed frame 398, locking the door 406 against the fixed frame 398. The latch lever 442 is coupled to the plunger 482. When the operator moves the latch lever 442 in a direction against the biasing force of the spring 486, the plunger 482 retracts. When the plunger 482 is retracted to a position in which it no longer contacts the interior side 430 of the fixed frame 398, the door 406 unlocks, and the operator may open the door 406 by pulling the handle 478.

Referring now to FIGS. 2D and 4, the upper window pane 410 and the lower window pane 418 each comprise a flat sheet of transparent polycarbonate material having an interior side 494 and an exterior side 498. The upper window pane 410 and the lower window pane 418 each include holes 502 positioned along a perimeter and corresponding to holes 466 on the door 406. The upper window seal 414 and the lower window seal 422 each have a rectangular shape defining a central open area substantially the same size as the upper portion 458 and the lower portion 462, respectively. The upper seal 414 is coupled to the interior side 494 of the upper window pane 410, while the lower seal 422 is coupled to the interior side 494 of the lower window pane 418. The upper window pane 410 is then aligned with the upper portion 458 of the door 406 and fastened to the upper portion 458 such that the upper seal 414 is compressed between the upper portion 458 and the upper pane 410. The lower pane 418 is mounted on the lower portion 462 in a similar manner.

As shown in FIGS. 2D and 4, the door 406 is mounted onto the fixed frame 398 by aligning the interior side 446 of the door 406 with the exterior side 434 of the fixed frame 398, such that the hinge members 470 on the door 406 are positioned proximate to the hinge members 438 on the fixed frame 398. A pin 506 is then passed through the hinge members 438, 470 to pivotally couple the two hinge members 438, 470 together. The fixed frame 398 is then mounted on the second side wall 58 of the housing 14.

In operation, particularly in an emergency, the mining machine may be stopped next to a mine wall or other obstruction such that the cab door 22 is blocked and cannot be opened. In this case, the operator is prevented from exiting through the cab door 22. The window latches 150, 154 on the front window assembly 30 and the rear window assembly 26 allow the operator to remove the pane frame 70 so that the operator can exit the cab 62 through the window openings.

Figure 5:
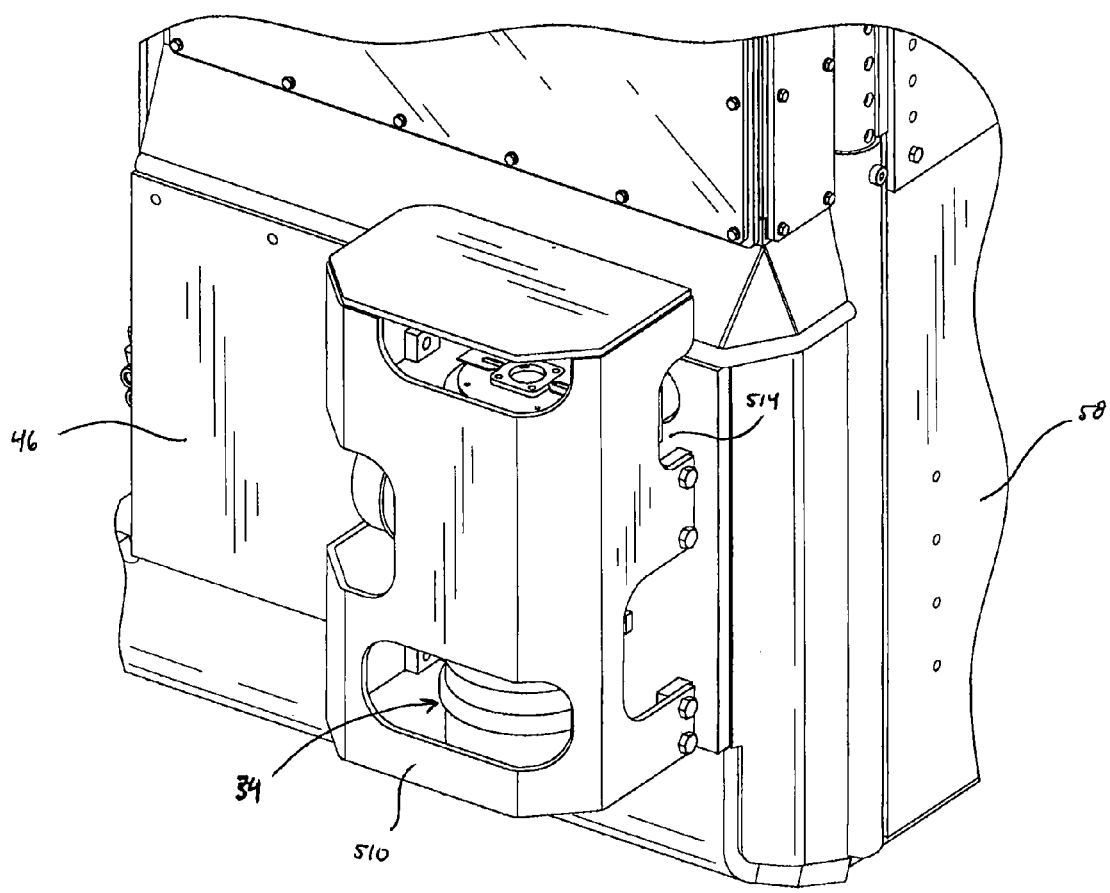
FIG. 5 is an enlarged, perspective view of a rear of the enclosed cab shown in FIG. 1.
Figure 5A:
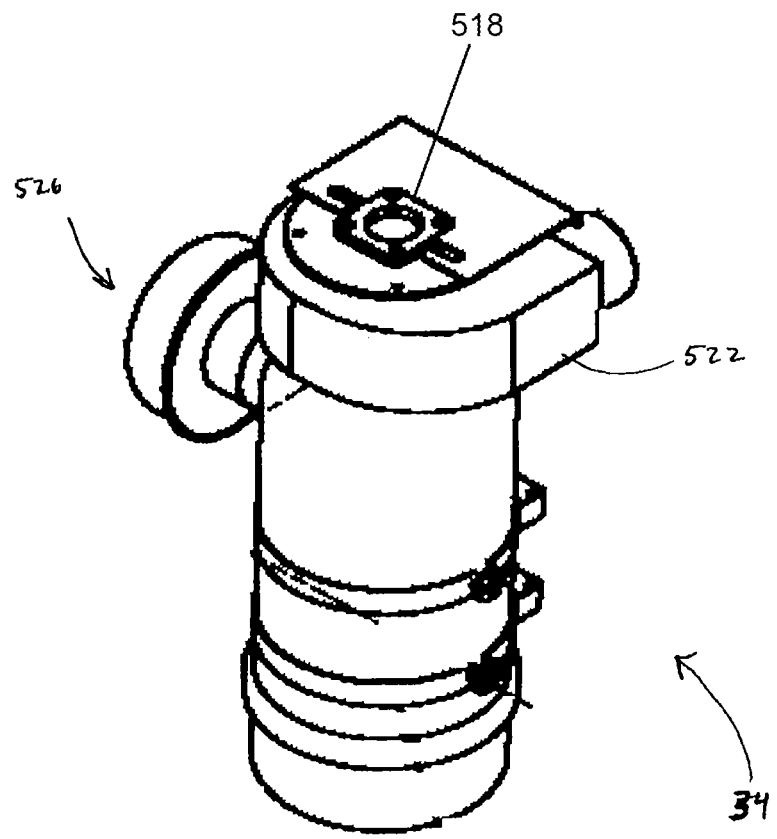
FIG. 5A is a perspective view of a pressurization system for use with the enclosed cab shown in FIG. 1.

Referring to FIGS. 5 and 5A, the pressurization system 34 is coupled to the rear wall 46 of the housing 14 and housed within a bulkhead 510 having cutouts 514. The pressurization system 34 includes a motor 518, a blower 522 in fluid communication with the operator cab 62 through an air filter assembly 526, and an air outlet (not shown). The motor 518 is hydraulically driven in that it operates under the influence of hydraulic fluid. The use of hydraulic power rather than, for example, electric power, reduces the risk of a component igniting volatile or explosive reactants in the surrounding mine environment. In operation, the motor 518 drives the blower 522, which circulates air through the air filter assembly 526 and into the operator cab 62, creating an elevated pressure within the cab 62. The sealed space created by the rear window assembly 26, front window assembly 30, side window assembly 18, and the cab door 22 insulate the operator cab 62 from the surrounding environment, increasing the pressurization system's efficiency. The elevated pressure prevents dust or particulate matter from entering the cab 62, thus maintaining a clean working environment for the operator. Air circulated within the cab 62 is discharged into the surrounding environment through the air outlet (not shown) and the cutout 514 in the bulkhead 510.

Figure 9:
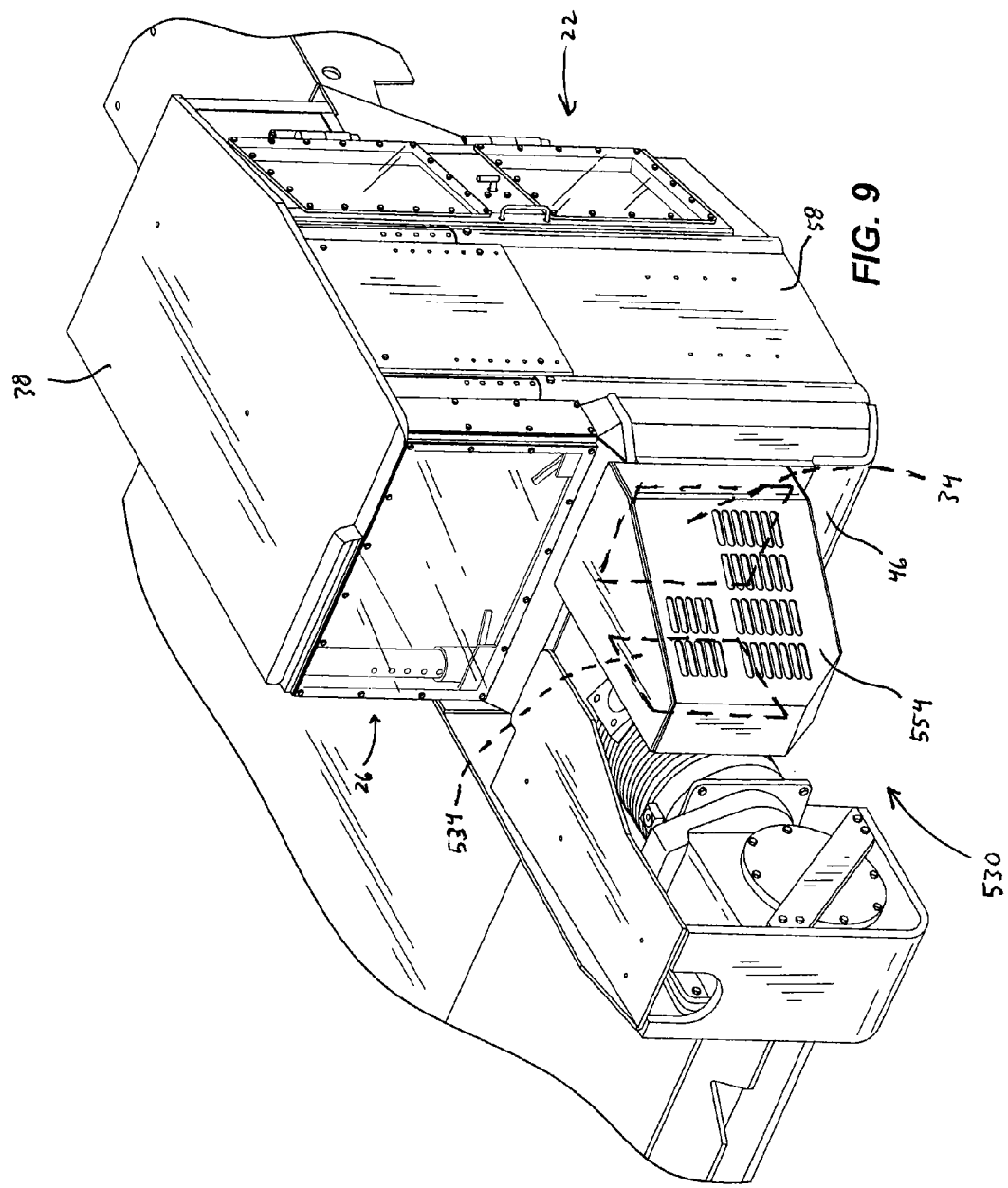
FIG. 9 is a top perspective view of a climate control system for use with the enclosed cab shown in FIG. 1.
Figure 10:
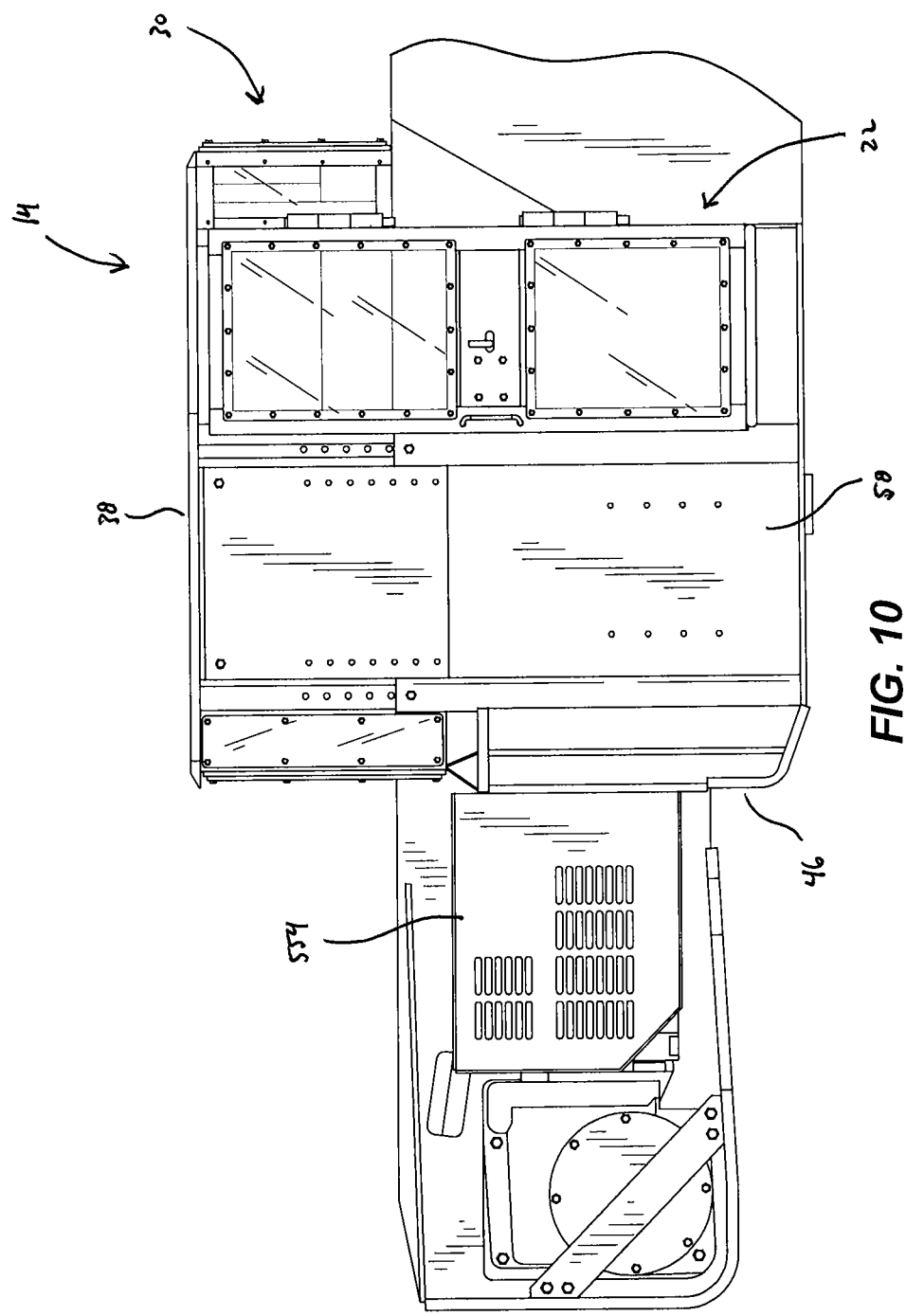
FIG. 10 is a side view of the climate control system.
Figure 11:
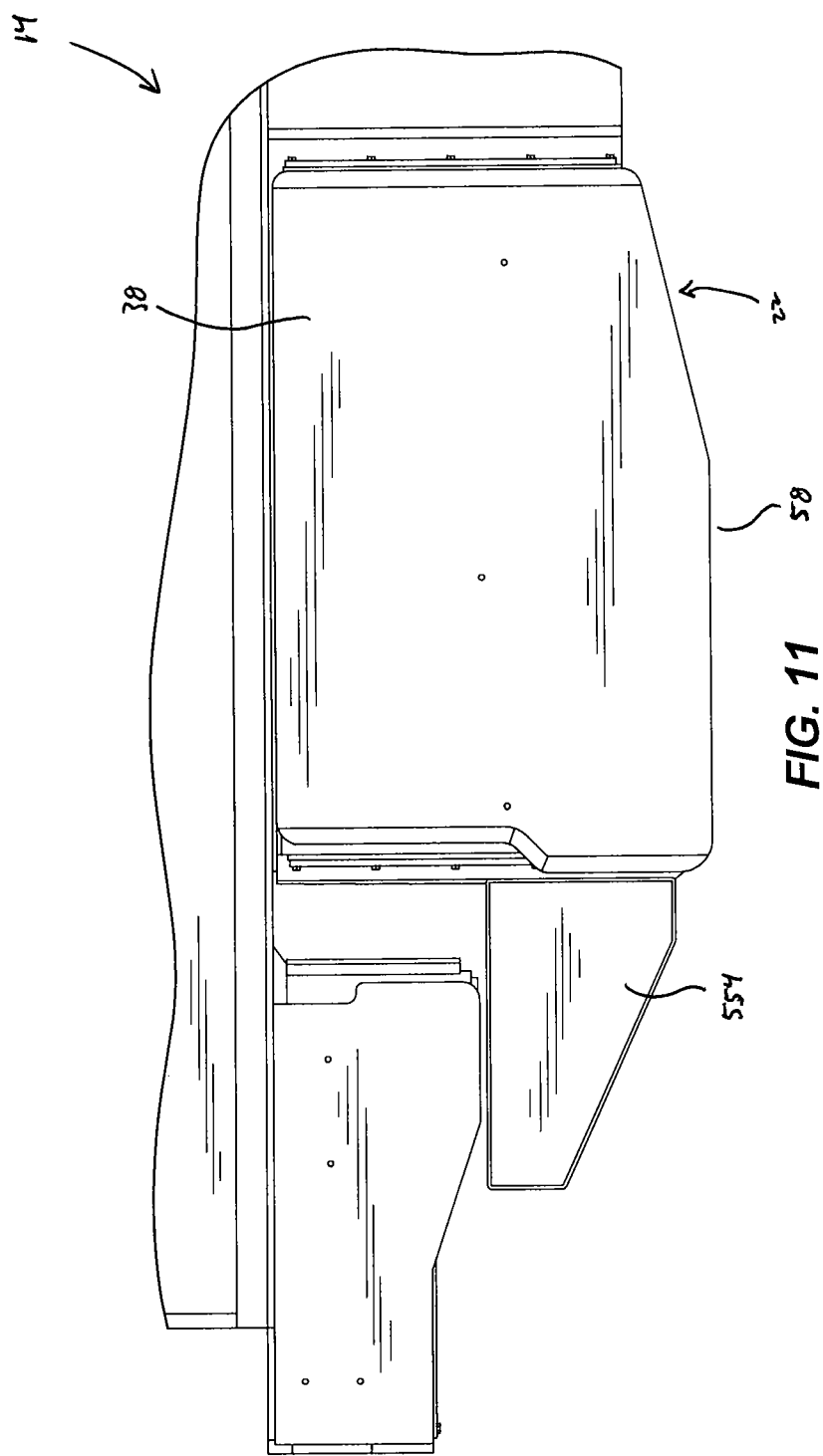
FIG. 11 is a top view of the climate control system.
Figure 12:
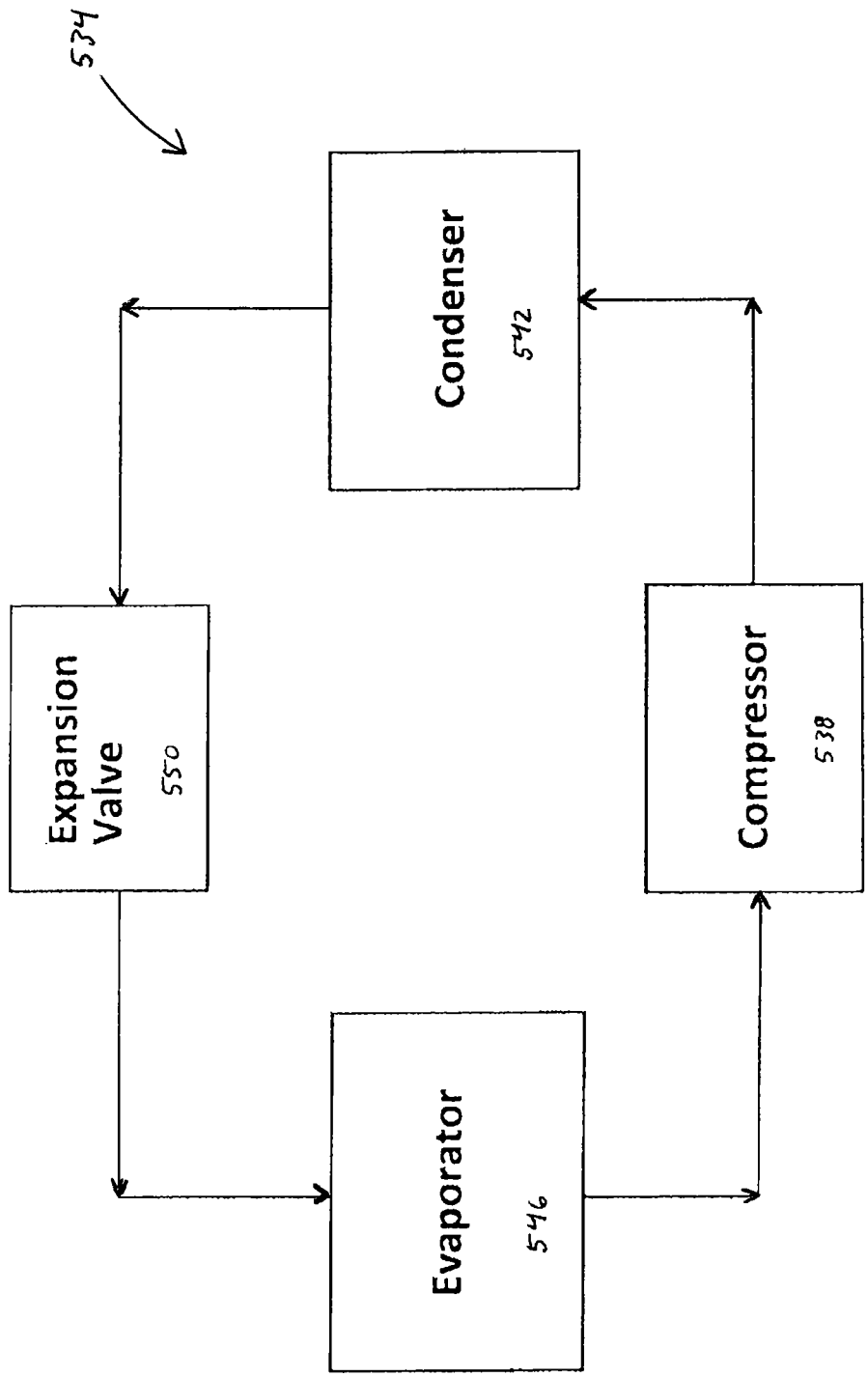
FIG. 12 is a schematic of the climate control system.

In another embodiment, shown in FIGS. 9-11, the underground mining machine includes the enclosed cab 10 having a climate control system 530 housed within a bulkhead 554 and includes an air conditioning system 534 and the pressurization system 34. As illustrated in FIGS. 9-11, the bulkhead 554 is coupled to the rear wall 46 of the housing 14. Referring to FIG. 12, the air conditioning system 534 includes a compressor 538, condenser 542, evaporator 546, and expansion valve 550. The components operate in the same way as a conventional air conditioning system. The air conditioning system 534 is in communication with the operator cab 62 and removes heat from the cab 62 to the surrounding environment. The compressor 538 is hydraulically driven in that it operates under the influence of hydraulic fluid. The use of hydraulic power rather than, for example, electric power, reduces the risk of a component igniting volatile or explosive reactants in the surrounding mine environment. The air conditioning system 534 maintains a comfortable temperature within the cab 62.

In other embodiments, the rear window assembly 26, front window assembly 30, and side window assembly 18 may be formed in a non-rectangular shape, such as a circular or elliptical shape. Similarly, the window panes for the window assemblies 26, 30, 18 and the cab door 22 may be formed in a non-rectangular shape. The window panes may have a non-flat profile such as, for example, a bulging profile that allows the window pane to extend outwardly from the housing wall when mounted within the primary frame. Also, the window pane for each of the window assemblies 26, 30, 18 and the cab door 22 may be formed from a material other than polycarbonate, such as glass (including laminated glass), Plexiglas, or a polymer. The cab door 22 may also be formed such that there is only one window pane, or may have no window panes.

Figure 13:
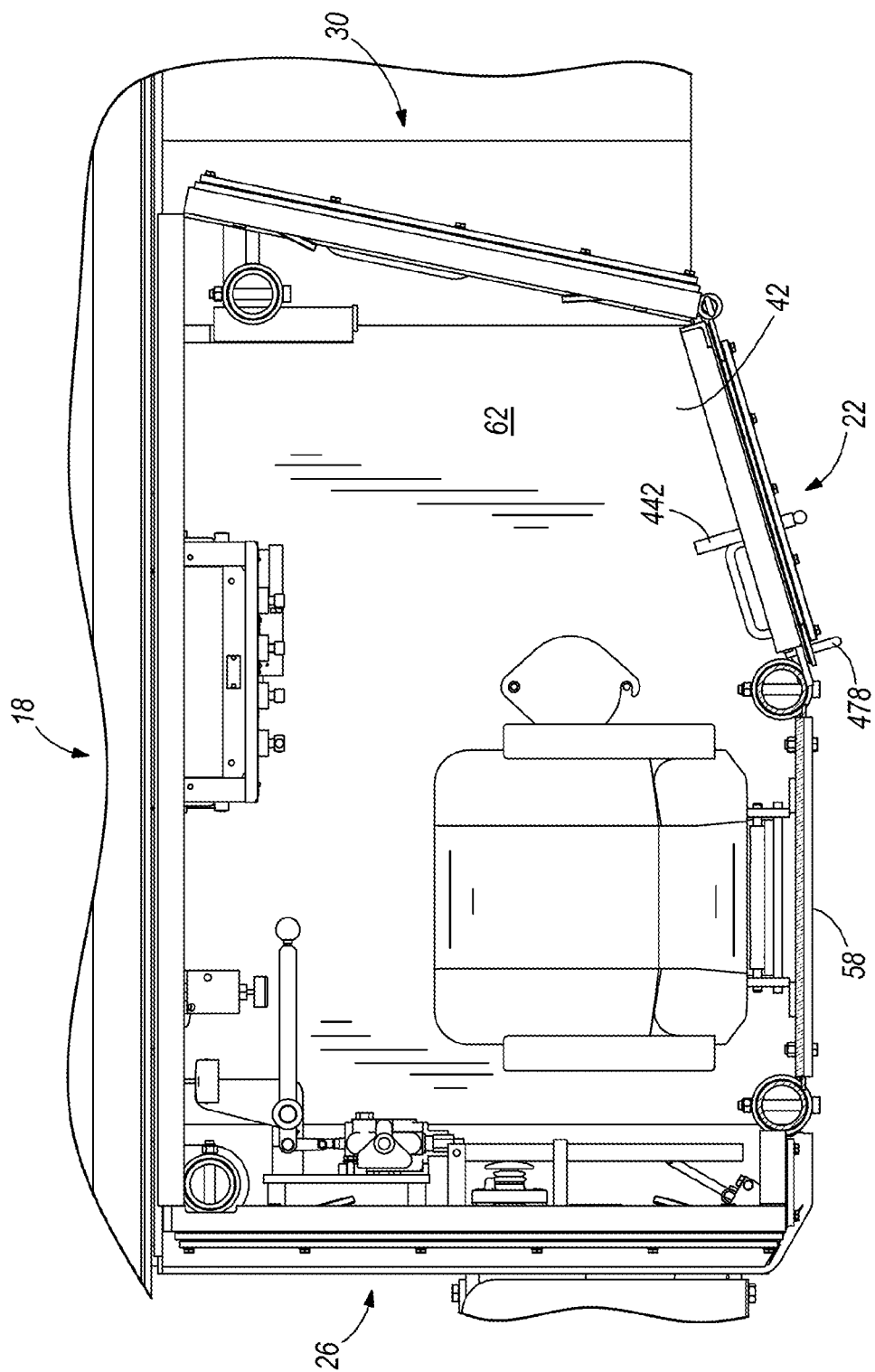
FIG. 13 is a top view of an enclosed cab according to another embodiment.
Figure 14:
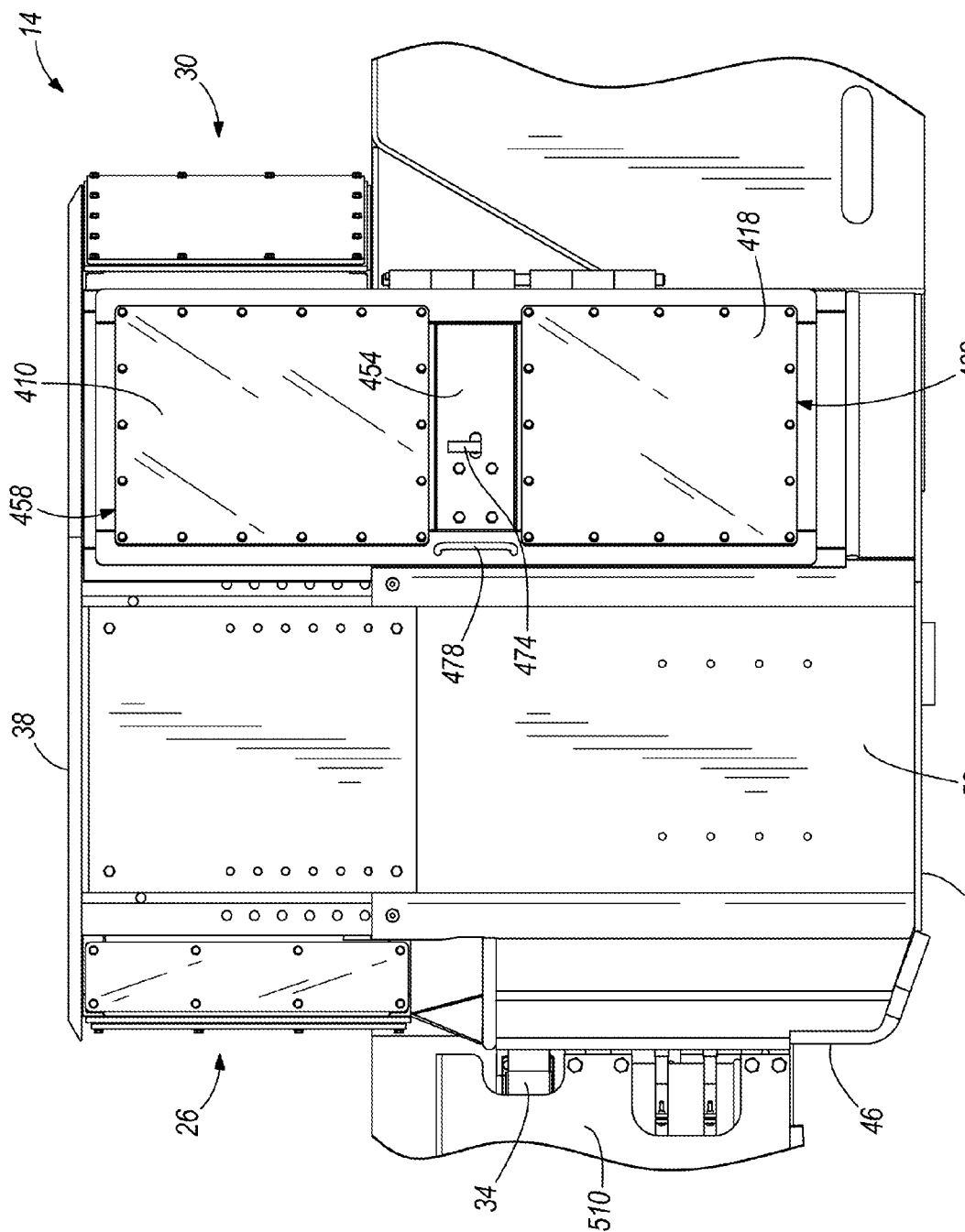
FIG. 14 is a side view of the enclosed ca of FIG. 13.

In another embodiment, the rear and front window assemblies 26, 30 may be formed with only a main support for mounting the window panes (i.e., without an auxiliary support). For instance, FIGS. 13 and 14 show the cab 62 in which the front window assembly 30 does not include an auxiliary support 98 or an auxiliary pane 78. The rear and front window assemblies 26, 30 may also be configured without a pane frame or any latch mechanism, such that the main window panes of the rear and front window assemblies 18 cannot be removed from the primary frame.

Thus, the invention provides, among other things, a system for enclosing the operator cab of a mining machine. Various features and advantages of the invention are set forth in the following claims.

The invention claimed is:

1. An operator cab for a shuttle car having a drive mechanism for moving the shuttle car within a mine and a bed for loading and unloading material to be transported, the operator cab comprising:
   a cab frame defining an interior chamber positioned laterally relative to the bed and the drive mechanism, the cab frame defining an opening;
   a front window assembly including a pane, a latch, and a pane seal, the front window assembly removably coupled to the cab frame such that, when the latch is in a closed position, the pane covers the opening and encloses the interior chamber and the pane seal is positioned between the pane and the cab frame, and when the latch is in an open position, the front window assembly is separated from the cab frame to permit egress from the interior chamber; and
   a pressurization system for providing a positive pressure in the interior chamber relative to the surrounding environment, the pressurization system including a blower and a motor for driving the blower, the blower being in fluid communication with the interior chamber.

2. The cab of claim 1, wherein the motor of the pressurization system is hydraulically driven.

3. The cab of claim 1, wherein the front window assembly further includes a pane frame coupled to the pane and the latch removably couples the pane frame to the cab frame, the pane seal being coupled to the pane frame such that the pane seal is positioned between the pane frame and the cab frame.

4. The cab of claim 3, wherein the latch is accessible from within the interior chamber.

5. The cab of claim 1, wherein the window pane is formed from a polycarbonate material.

6. The cab of claim 1, further comprising an air conditioning system for removing heat from the interior chamber to the surrounding environment.

7. The cab of claim 6, wherein the air conditioning system further includes a compressor that is hydraulically driven.

8. The cab of claim 1, further comprising a door moveable between a closed position and an open position, the door sealingly engaging the cab frame when the door is in the closed position.

9. The cab of claim 8, further comprising a rear window assembly positioned opposite the front window assembly and including a pane, a latch, and a pane seal, the rear window assembly removably coupled to the cab frame such that, when the latch is in a closed position, the pane covers the opening and encloses the interior chamber and the pane seal is positioned between the pane and the cab frame, and when the latch is in an open position, the rear window assembly is separated from the cab frame to permit egress from the interior chamber.

10. An operator cab for a shuttle car having a drive mechanism for moving the shuttle car within a mine and a bed for loading and unloading material to be transported, the operator cab comprising:
   a cab frame defining an interior chamber positioned laterally relative to the bed and the drive mechanism, the cab frame defining an opening;
   a front window assembly including a pane, a latch, and a pane seal, the front window assembly removably coupled to the cab frame such that, when the latch is in a closed position, the pane covers the opening and encloses the interior chamber and the pane seal is positioned between the pane and the cab frame, and when the latch is in an open position, the front window assembly is separated from the cab frame to permit egress from the interior chamber; and
   an air conditioning system for controlling the temperature within the interior chamber, the air conditioning system being hydraulically-driven.

11. The cab of claim 10, further comprising a blower in fluid communication with the interior chamber to provide a positive pressure within the interior chamber relative to the surrounding environment.

12. The cab of claim 10, wherein the front window assembly further includes a pane frame coupled to the pane and the latch removably couples the pane frame to the cab frame, the pane seal being coupled to the pane frame such that the pane seal is positioned between the pane frame and the cab frame.

13. The cab of claim 12, wherein the latch is accessible from within the interior chamber.

14. The cab of claim 10, further comprising a door moveable between a closed position and an open position, the door sealingly engaging the cab frame when the door is in the closed position.

15. A shuttle car comprising:
   a body defining a first end and a second end, the body including a conveyor chain for loading and unloading material to be transported;
   a drive system for moving the shuttle car; and
   an enclosed operator cab including
      a cab frame defining an interior chamber having an opening;
      a window assembly facing toward one of the first end and the second end of the body, the window assembly including a pane, a latch, and a pane seal, the window assembly removably coupled to the cab frame such that, when the latch is in a closed position, the pane covers the opening and encloses the interior chamber and the pane seal is positioned between the pane and the cab frame, and when the latch is in an open position, the window assembly is separated from the cab frame to permit egress from the interior chamber; and a pressurization system for providing a positive pressure in the interior chamber relative to the surrounding environment, the pressurization system including a blower and a motor for driving the blower, the blower being in fluid communication with the interior chamber.

16. The shuttle car of claim 15, wherein the motor of the pressurization system is hydraulically driven.

17. The shuttle car of claim 15, wherein the window assembly further includes a pane frame coupled to the pane and the latch removably couples the pane frame to the cab frame, the pane seal being coupled to the pane frame such that the pane seal is positioned between the pane frame and the cab frame.

18. The shuttle car of claim 17, wherein the latch is accessible from within the interior chamber.

19. The shuttle car of claim 15, further comprising an air conditioning system for removing heat from the interior chamber to the surrounding environment.

20. The shuttle car of claim 19, wherein the air conditioning system further includes a compressor that is hydraulically driven.

21. The shuttle car of claim 15, wherein the window assembly is a first window assembly, and further comprising a second window assembly facing toward the other of the first end and the second end of the body, the second window assembly including a second pane, a second latch, and a second pane seal, the second window assembly removably coupled to the cab frame such that, when the second latch is in a closed position, the second pane covers the opening and encloses the interior chamber and the second pane seal is positioned between the second pane and the cab frame, and when the second latch is in an open position, the second window assembly is separated from the cab frame to permit egress from the interior chamber.

22. An underground mining machine comprising:
a frame portion including a mechanism for loading and unloading material to be transported;
a drive system supporting the frame portion;
a cab frame defining an interior chamber positioned laterally relative to the frame portion and the drive mechanism, the cab frame defining an opening;
a climate control system including:
a front window assembly including a pane, a latch, and a pane seal, the front window assembly removably coupled to the cab frame to cover the opening and the pane seal positioned between the pane and the cab frame to seal the interior cab when the latch is in a closed position, and the front window assembly is separated from the cab frame to permit egress from the interior chamber when the latch is in an open position;
a pressurization system for providing a positive pressure in the interior chamber relative to a surrounding environment, the pressurization system including a blower and a motor for driving the blower, the blower being in fluid communication with the interior chamber; and
an air conditioning system for controlling the temperature within the interior chamber.

23. The climate control system of claim 22, wherein the motor of the pressurization system is hydraulically driven.

24. The climate control system of claim 22, wherein the air conditioning system includes a compressor that is hydraulically driven.

25. The climate control system of claim 22, wherein the window assembly further includes a pane frame coupled to the pane and the latch removably couples the pane frame to the cab frame, the pane seal being coupled to the pane frame such that the pane seal is positioned between the pane frame and the cab frame.

* * * * *